United States Patent
Ringland et al.

(10) Patent No.: US 8,472,951 B2
(45) Date of Patent: Jun. 25, 2013

(54) ESTABLISHING COMMUNICATIONS SESSIONS

(75) Inventors: Simon P A Ringland, Ipswich (GB); Francis J Scahill, Ipswich (GB)

(73) Assignee: British Telecommunications public limited company, London (GB)

(*) Notice: Subject to any disclaimer, the term of this patent is extended or adjusted under 35 U.S.C. 154(b) by 1049 days.

(21) Appl. No.: 11/886,222

(22) PCT Filed: Feb. 28, 2006

(86) PCT No.: PCT/GB2006/000708
§ 371 (c)(1),
(2), (4) Date: Sep. 13, 2007

(87) PCT Pub. No.: WO2006/097677
PCT Pub. Date: Sep. 21, 2006

(65) Prior Publication Data
US 2008/0144796 A1    Jun. 19, 2008

(30) Foreign Application Priority Data
Mar. 18, 2005  (EP) ..................................... 05251671

(51) Int. Cl.
*H04W 60/00* (2009.01)
*H04M 7/06* (2006.01)

(52) U.S. Cl.
USPC ..................................... 455/435.1; 370/353

(58) Field of Classification Search
USPC ............. 370/353, 328, 352, 329; 379/265.09, 379/265.04; 455/446, 432.3, 445, 433, 453, 455/435.1, 406, 415, 418; 380/270, 250, 380/277
See application file for complete search history.

(56) References Cited

U.S. PATENT DOCUMENTS

| | | | | |
|---|---|---|---|---|
| 5,991,394 A * | 11/1999 | Dezonno et al. | ......... | 379/265.09 |
| 6,088,436 A | 7/2000 | Mashinsky | | |
| 6,192,050 B1 | 2/2001 | Stovall | | |
| 6,594,357 B1 * | 7/2003 | Emerson et al. | ......... | 379/265.04 |
| 7,317,919 B1 * | 1/2008 | Ruf | ............................. | 455/446 |
| 2002/0057678 A1 * | 5/2002 | Jiang et al. | .................... | 370/353 |
| 2004/0110489 A1 | 6/2004 | Murri et al. | | |

FOREIGN PATENT DOCUMENTS

| | | |
|---|---|---|
| EP | 0802663 A2 | 10/1997 |
| GB | 2342536 A | 4/2000 |
| WO | WO 02/13496 A2 | 2/2002 |

OTHER PUBLICATIONS

European Search Report dated Aug. 22, 2005 in EP 05251671.
International Search Report dated Apr. 7, 2006 in PCT/GB2006/000708.

* cited by examiner

*Primary Examiner* — Kiet Doan
(74) *Attorney, Agent, or Firm* — Nixon & Vanderhye P.C.

(57) ABSTRACT

A method of establishing a communications session in a communications system is disclosed. The communications system comprises a user terminal, a mobile terminal associated with a contact a and session initiation unit. The method comprises: identifying the contact using the user terminal; transmitting contact data identifying the contact and user data associated with the user terminal from the user terminal to said session initiation unit; in dependence on the contact data, transmitting a request from the session initiation unit to the mobile terminal, the request comprising the user data and requesting that the mobile terminal establishes the communications session with the user terminal in dependence on the user data.

11 Claims, 4 Drawing Sheets

ESTABLISHING COMMUNICATIONS SESSIONS

This application is the U.S. national phase of international application PCT/GB2006/000708 filed 28 Feb. 2006 which designated the U.S. and claims benefit of EP 05251671.3, dated 18 Mar. 2005, the entire content of each of which is hereby incorporated by reference.

BACKGROUND AND SUMMARY

This invention relates to a method of establishing a communications session in a communication system. In particular, it relates to a method of establishing a telephone call.

When a telephone call is made from a first telecommunications network (e.g. a fixed telecommunications network) to a second telecommunications network (e.g. a mobile telecommunications network), the first network operator charges the second network operator a fee to complete the telephone call; known as a termination charge. Since the termination charge levied by mobile network operators is higher than that levied by fixed network operators, the cost of a telephone call from a fixed network to a mobile network is higher than the cost of a telephone call from a mobile network to a fixed network. For many corporations, the cost of their office based workforce making telephone calls out to colleagues using mobile telephones (i.e. fixed network to mobile network telephone calls) is significant and cost reductions could be achieved if the direction of these calls could be reversed and therefore billed as mobile network to fixed network calls.

According to a first aspect of the present invention there is provided a method of establishing a communications session in a communications system, said communications system comprising a user terminal, a mobile terminal associated with a contact and session initiation means, said method comprising:

identifying said contact using said user terminal;
responsive to identifying said contact, transmitting contact data identifying said contact and user data associated with said user terminal from said user terminal to said session initiation means;
in dependence on and responsive to reception of said contact data, transmitting a request from said session initiation means to said mobile terminal, said request comprising said user data and requesting that said mobile terminal establishes said communications session with said user terminal in dependence on said user data.

According to a second aspect of the present invention there is provided communication session initiation apparatus for establishing a communications session in a communications system, said communications system comprising a user terminal and a mobile terminal associated with a contact, said apparatus comprising:

data receiving means arranged in operation to receive from said user terminal, contact data identifying said contact and user data associated with said user terminal;
request transmission means arranged in operation to transmit a request to said mobile terminal in dependence on and responsive to reception of said contact data, said request comprising said user data and requesting that said mobile terminal establishes said communications session with said user terminal in dependence on said user data.

By identifying a contact using a user terminal; and responsive to identifying said contact, transmitting contact data identifying the contact and user data associated with the user terminal from the user terminal to session initiation means; and, in dependence on and responsive to reception of the contact data, transmitting a request from the session initiation means to a mobile terminal associated with the contact, the request comprising the user data and requesting that the mobile terminal establishes a communications session with the user terminal in dependence on the user data, a communications session between a user terminal and a mobile terminal can be initiated on the user terminal but established by the mobile terminal. The direction of the communications session for billing purposes is therefore from the mobile terminal to the user terminal despite the fact that the session was initiated from the user terminal. The cost of the communications session is likely to be less than if the direction of the session was from the user terminal to the mobile terminal.

Preferably, billing for the established communications session is applied to an account associated with the mobile terminal.

In preferred embodiments, the user terminal comprises a user computer and a user telephone associated with the user computer, and the user data comprises a telephone number associated with the user telephone. In such embodiments, the method preferably further comprises the antecedent step of associating the user computer with the user telephone by storing, in a user registration database, a mapping between computer identification data identifying the user computer and telephone identification data identifying the user telephone. Thus a telephone can be associated with a computer and then the computer can be used to initiate telephone calls.

Preferably, the user data comprises the telephone identification data. Alternatively, the user registration database is accessible by the session initiation means and the user data comprises the computer identification data.

In alternative embodiments, the user terminal comprises a user telephone, the communication session comprises a telephone call and the user data comprises a telephone number associated with said user telephone. For example, the user telephone could comprise a fixed line, corded or analogue or digital cordless telephone or a mobile telephone.

In preferred embodiments, the contact data identifying the contact is stored in a contacts database accessible by the user terminal.

Preferably, the method further comprises storing said contact data in a contact registration database accessible by said session initiation means. In this way, a record of registered contacts can be created and stored in the network, which can be used to restrict access to a service operating in accordance with this method to contacts registered to use the service.

In alternative embodiments, the communication session comprises a multimedia communications session (e.g. a video call).

In preferred embodiments the mobile terminal comprises a mobile telephone. In other embodiments it comprises, for example, a personal digital assistant suitably enabled to access a communications network. In such embodiments, the contact data identifying said contact comprises the telephone number associated with the mobile telephone.

Preferably, the request further comprises a security token to be verified by the mobile terminal before responding to the request. Thus it is possible to stop someone sending spurious call setup requests to the mobile terminal.

BRIEF DESCRIPTION OF THE DRAWINGS

Embodiments of the present invention will now be described, by way of example only, with reference to the accompanying drawings, wherein like reference numbers refer to like parts, and in which.

DETAILED DESCRIPTION

Figure 1:
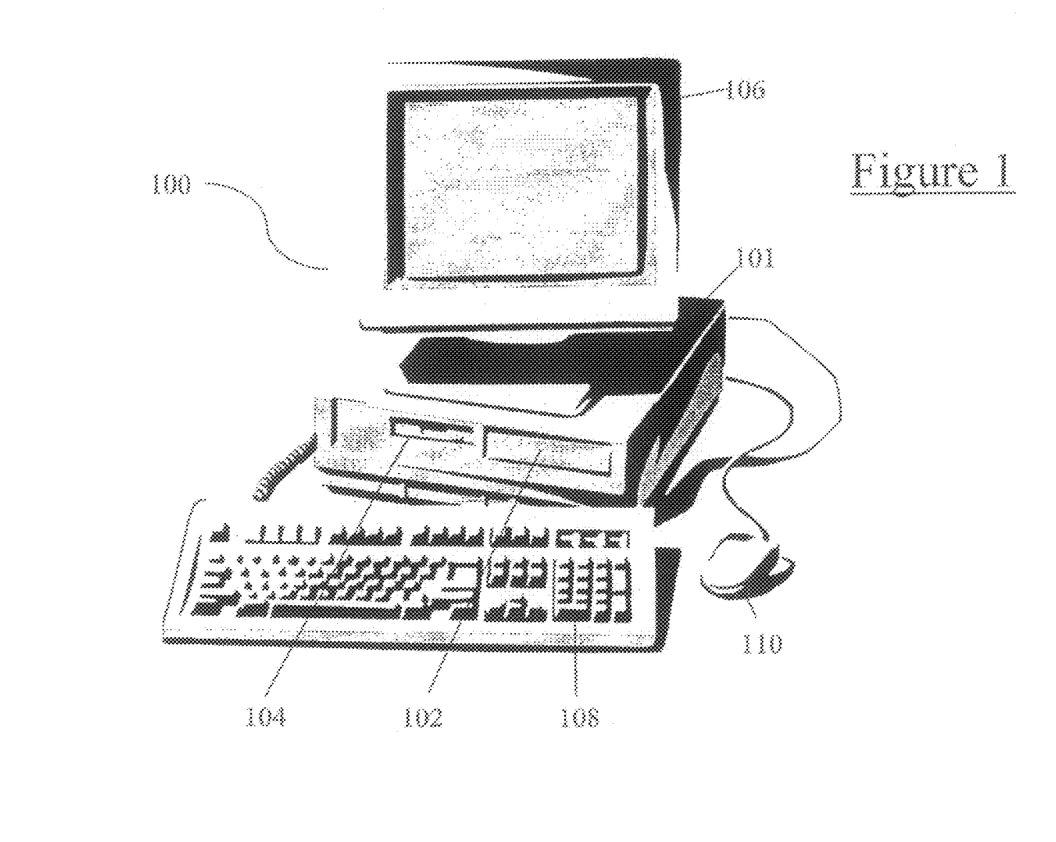
FIG. 1 is an illustration of a general purpose computer system.

With reference to FIG. 1, a general purpose computer system 100, which is generally known in the art, comprises a desk-top tower base unit 101 within which is contained a computer processing unit, mother board, hard disk drive or drives, system memory and an optical disk drive 102 which is capable of reading from and/or writing to a removable optical disk such as a CD, CD-R, CD-RW, DVD, or the like. Furthermore, the base unit 101 also houses a magnetic floppy disk drive 104 capable of accepting and reading from and/or writing to magnetic floppy disks. The base chassis unit 101 also has provided on the back thereof numerous input and output ports for peripherals such as a monitor 106 used to provide a visual display to the user. A user may input data and commands to the computer system via a keyboard 108, or a pointing device such as a mouse 110.

It will be appreciated that FIG. 1 illustrates an exemplary computer system only, and that other configurations of computer systems are possible which can be used with the present invention. In particular, the base unit 101 may be in a tower configuration, or alternatively the computer system may be portable in that it is embodied in a lap-top, note-book or handheld configuration.

Also housed within the base unit 101 is a network interface in the form of a network card or the like arranged to allow the computer system to communicate with other computer systems over a network. The network may be a local area network (LAN), wide area network (WAN), local wireless network, or the like. The network interface allows the computer system to form logical connections over the network with other computer systems such as servers, routers, or peer-level computers, for the exchange of programs or data. With respect to the network interface, it should also be understood that the computer system may equally be provided with a modem attached to a serial or parallel port interface, and which is arranged to form logical connections from the computer system to other computers via the public switched telephone network (PSTN).

Where the computer system is used in a network environment, it should further be understood that the application programs, other programs, and other data which may be stored locally in the computer system may also be stored, either alternatively or additionally, on remote computers, and accessed by the computer system by logical connections formed over network.

All of the hard disk drive, optical disks used with the optical drive, or floppy disks used with the floppy disk provide non-volatile storage of computer readable instructions, data files, program modules, and other data for the computer system. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive, or any floppy disks or optical disks, may store a variety of programs, program modules, or data. In particular, the hard disk drive in the embodiment particularly stores application programs, application program data, other programs required by the computer system or the user, a computer system operating system such as Microsoft® Windows®, Linux™, Unix™, or the like, as well as other user data. The hard disk drive provides non volatile storage of the aforementioned programs and data such that the programs and data can be permanently stored without power.

Figure 2:
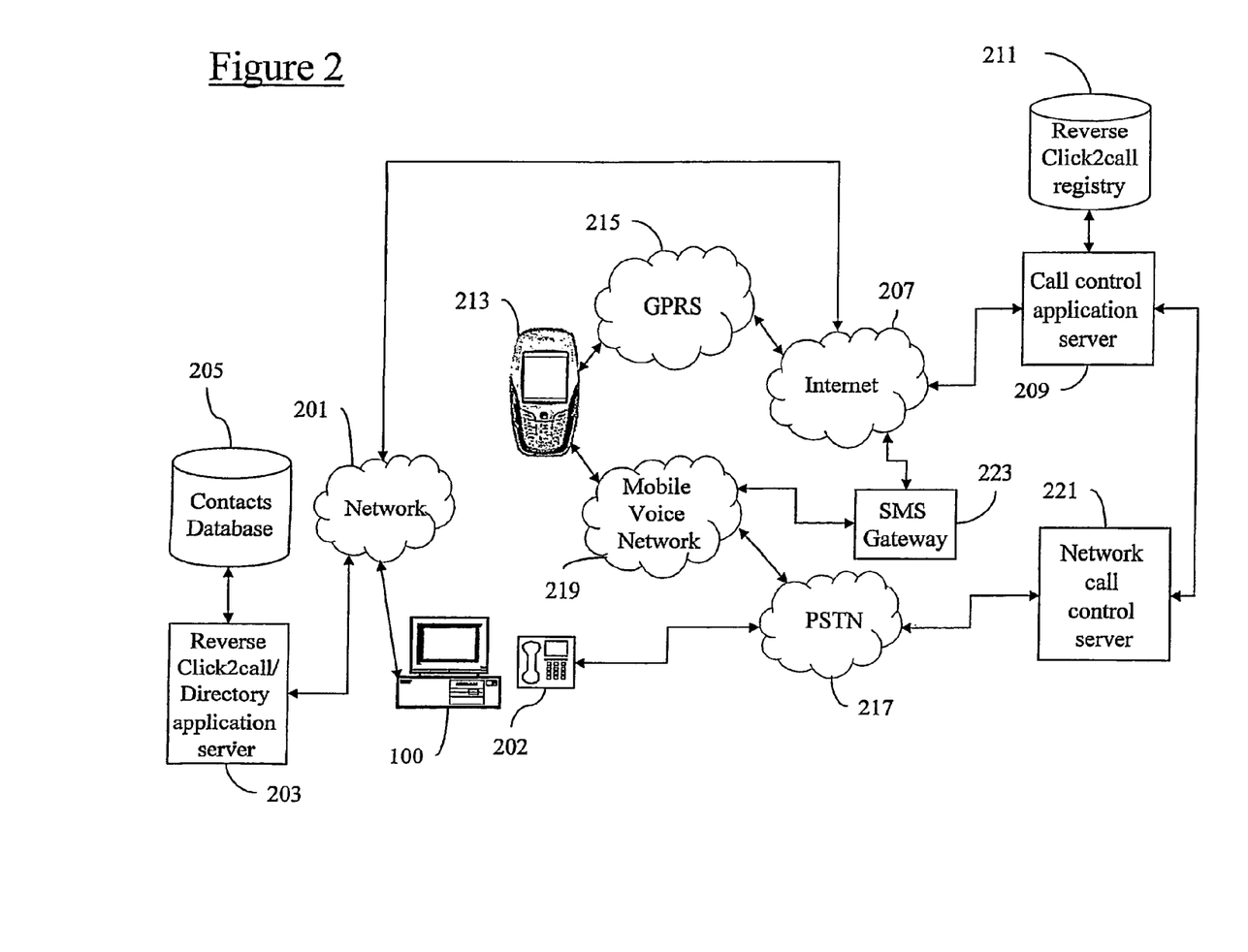
FIG. 2 is an illustration of a communications system according to an embodiment of the present invention.

With reference the FIG. 2, computer system 100 forms part of a communications system and is connected to network 201. In the present embodiment, network 201 comprises a company's LAN (intranet). The computer system 100 is equipped with an address book application client (not shown). A telephone 202 is associated with computer system 100 in a manner described in more detail below. Telephone 202 is connected to a public switched telephone network (PSTN) 217. It will be clear to those skilled in the art that a plurality of computer systems similar to computer system 100 will also be connected to network 201 and will each be associated with a telephone similar to telephone 202.

Figure 4:
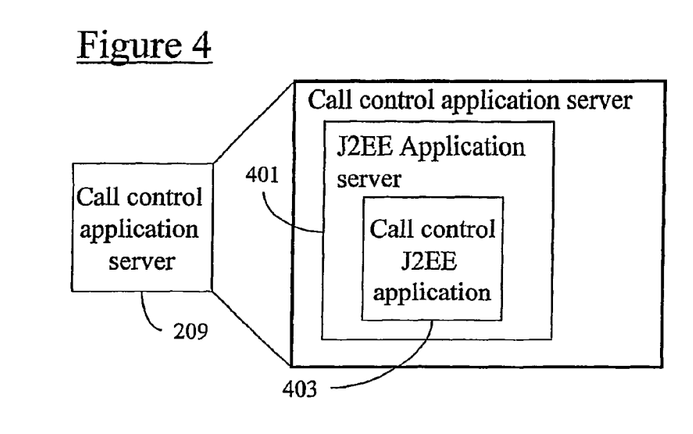
FIG. 4 is an illustration of the call control application server of the communications system of FIG. 2.

The network 201 of the communications system is further connected to the internet 207, to which is connected to a call control application server 209, which is described in more detail in relation to FIG. 4. The call control application server 209 comprises a Java 2 Enterprise Edition (J2EE) application server 401 on which the call control J2EE application 403 resides. Call control application server is itself connected to Reverse Click2call registry 211, which comprises Extensible Markup Language (XML) datafiles. The role and population of Reverse Click2call registry 211 and the role of the call control application server 209 will be described in more detail later.

The communications system further comprises a mobile telephone handset 213 (such as the Nokia 6600), which is carried by an employee of the company, and which can connect to the internet 207 via a General Packet Radio Service (GPRS) network 215. Mobile handset 213 can also connect to a PSTN 217 via a mobile voice network 219 (such as those provided in the United Kingdom by Vodafone™, Orange, $O_2$, T-Mobile and 3).

Figure 5:
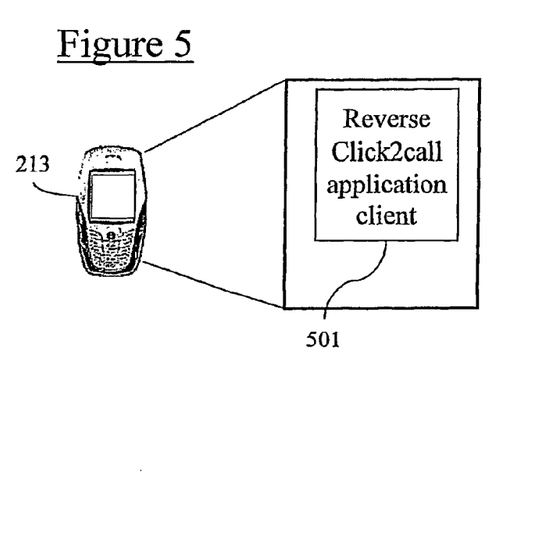
FIG. 5 is an illustration of the mobile telephone handset of the communications system of FIG. 2.

With reference to FIG. 5, mobile telephone handset 213 comprises a Reverse Click2call application client 501 that a user of handset 213 can download (e.g. over the GPRS network 215). In the present embodiment this application is a Java application (e.g. J2ME (Java 2 Mobile Edition) or personal Java) although it could also comprise a Symbian OS application or a SIM (subscriber identity module) card based application. It will be clear to those skilled in the art that each employee of the company could carry a mobile handset similar to mobile handset 213.

The communications system of FIG. 2 further comprises a network call control server 221 such as the Marconi Intelligent Networks platform, which provides third party call control functionality as specified by the standard Parlay Application Programming Interface (API). (Third party call control refers to the ability of one entity to create a telephone call in which communication is actually between other parties.) The network call control server 221 is connected to call control application server 209 and PSTN 217.

The communications system also comprises an SMS (short message service) gateway 223 such as that provided by (aq)

limited, Leeds, UK trading as sms2email. SMS gateway 223 is connected to internet 207 and mobile voice network 219 and is a means for call control application server 209 to send an SMS message to mobile handset 213 via the internet 207 and the SMS centre (not shown) of mobile voice network 219.

Figure 3:
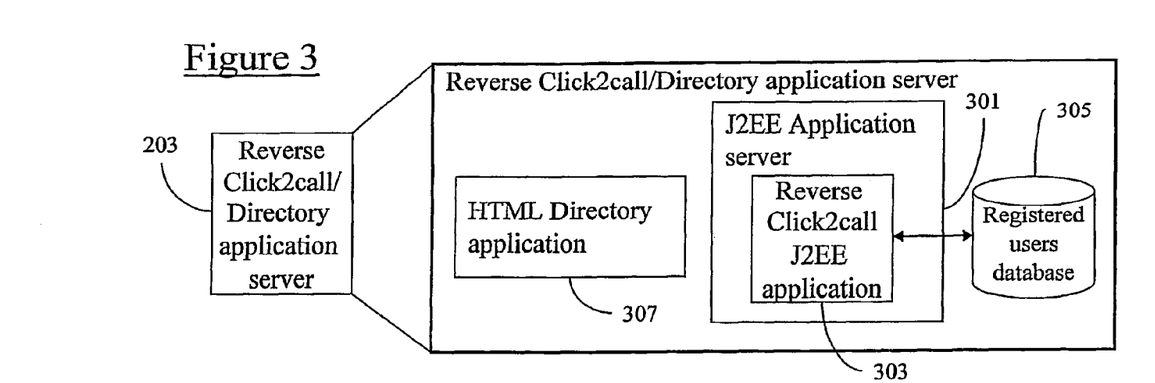
FIG. 3 is an illustration of the Reverse Click2call application server of the communications system of FIG. 2.

Also connected to network 201 of the communications system of FIG. 2 is Reverse Click2call/Directory application server 203, which is described in more detail with respect to FIG. 3. The Reverse Click2call/Directory application server 203 comprises a Java 2 Enterprise Edition (J2EE) application server 301 on which the Reverse Click2call J2EE application 303 resides. It also comprises a registered users database 305, which comprises Extensible Markup Language (XML) datafiles loaded by the Reverse Click2call/Directory application server 203. Reverse Click2call/Directory application server 203 is further connected to a contacts database 205 (which comprises Extensible Markup Language (XML) datafiles) and further comprises an HTML (hypertext markup language) directory application 307 that converts the contacts database 205 into an HTML view that can be displayed on monitor 106 using the computer's address book application client. In the present embodiment, the contacts database 205 comprises a corporate contact directory that lists contact details (including telephone numbers and mobile telephone numbers) of employees of the company. The role and population of contacts database 205 and registered users database 305, and the role of the Reverse Click2call/Directory application server 203 will be described in more detail later.

"ClickDial Web-Enabled CTI", Brockbank, R. et al, British Telecommunications Engineering, Volume 18, Part 1, April 1999 and the Applicant's U.S. Pat. No. 6,594,357, the details of both of which are hereby incorporated by reference, describe functionality whereby, in response to the user completing a registration process, an on-screen button is provided next to telephone numbers in a directory application. A user can interact with the directory application using a keyboard and mouse and can initiate the placing of a telephone call between themselves and a selected contact (using a telephone that has been associated with the computer during the registration process) by clicking on the button next to the name/number of the selected contact. In the present embodiment, on-screen buttons similar to those described above (called Click2call buttons in the present embodiment) are provided next to the telephone numbers of employees in directory application 307.

When a user clicks on a Click2call button next to the telephone number of a selected contact, directory application 307 of Reverse Click2call/Directory application server 203 translates that action as a request to set up a communications session between the user and the selected contact and a request is passed from Reverse Click2call/Directory application server 203 to call control application server 209. The Reverse Click2call/Directory application server 203 and call control application server 209 exchange messages over network 201 and internet 207, using HTTP request/response pairs, which are described in the chapter entitled "HTTP Transactions" in *HTTP Pocket Reference*, Wong, C., May 2000, ISBN 1-56592-862-8.

Figure 6:
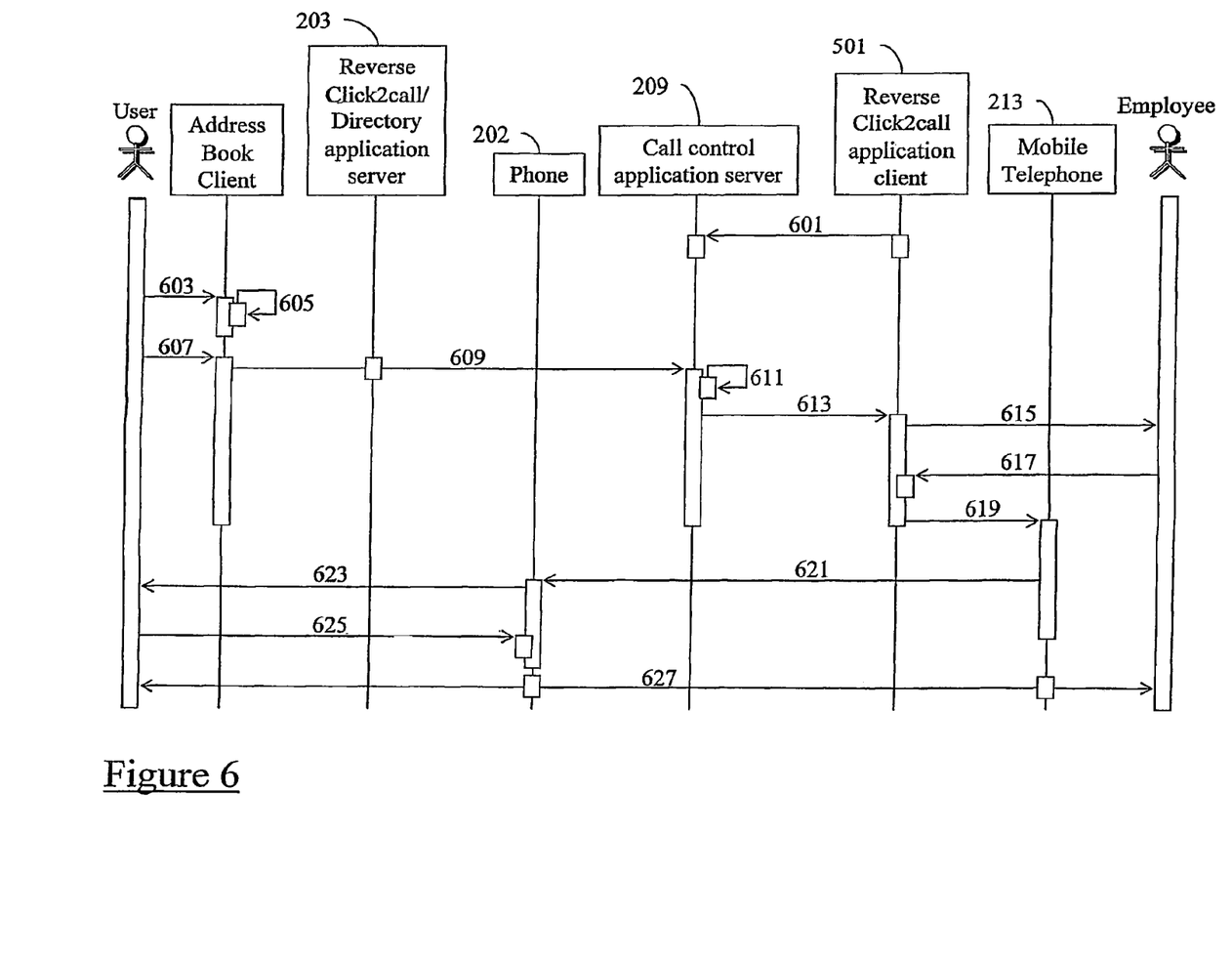
FIG. 6 is a sequence diagram illustrating the establishment of a communications session in accordance with an embodiment of the present invention.

The process of establishing a communications session in accordance with an embodiment of the present invention will now be described in relation to FIG. 6.

In an user initial registration stage (not shown), the user of computer system 100 and telephone 202 follows a registration process as described in the documents "ClickDial Web-Enabled CTI" and U.S. Pat. No. 6,594,357 that were cited above. This results in the computer system 100 being assigned a unique ID, which in the present embodiment comprises a cookie (a packet of information sent by a server to a web browser and then sent back by the browser each time is accesses the server) that is supplied by Reverse Click2call/Directory application server 203 and stored by computer system 100. The unique ID is also stored in registered users database 305 of Reverse Click2call/Directory application server 203 and is mapped to the telephone number associated with telephone 202.

In an initial employee registration stage (also not shown), an employee downloads the Reverse Click2call application client 501 to mobile handset 213 in a manner as described above. The first time that the Reverse Click2call application client 501 is run, it connects to call control application server 209 via GPRS network 215 in order to register the mobile handset 213 as being enabled to use the Reverse Click2call service. Further ways of effecting registration of mobile handset 213 will be apparent to someone skilled in the art. The effect of registration is that a record is created in the Reverse Click2call registry 211 which stores details of mobile handset 213. The details of mobile handset 213 that may be stored are the International Mobile Station Equipment Identity (IMEI) number (a number unique to every mobile handset), the International Mobile Subscriber Identity (IMSI) number (a number unique to the SIM card inside the mobile handset 101 and the Mobile Station Integrated Services Digital Network (MSISDN) number (the phone number of mobile handset/SIM card) or a combination thereof.

The Reverse Click2call application client 501 is configured to automatically start-up when mobile handset 213 is switched on (achieved by modifying the application settings within the mobile phone application manager utility). As mentioned above, in preferred embodiments, the Reverse Click2call application client 501 comprises a J2ME (Java 2 Platform, Micro Edition) application and communicates with call control application server 209 over GPRS network 215 and internet 207, using HTTP request/response pairs. After start-up, Reverse Click2call application client 501 connects to call control application server 209 (step 601) in order to register itself as being 'on-line', i.e. available to receive call setup requests. From this point on, it polls the call control application server 209 using an HTTP GET request to determine whether there are any call setup requests waiting. If there are no outstanding call setup requests, then the call control application server 209 waits for the polling timeout to expire before responding with an empty response message. When the Reverse Click2call application client 501 receives an empty response message, it repeats the request. The polling request is set to have a long timeout period but polling is carried out often enough to hold open a GPRS session. In the present embodiment, the preferred polling timeout is set to 5 minutes.

When the user of computer system 100 wishes to contact an employee, they access the computer's address book application client (603) in order to look up the employee (605) and click on the relevant Click2call button next to the telephone number of the selected employee (607).

As mentioned above, when a user clicks on a Click2call button next to the telephone number of a selected employee, the directory application 307 of Reverse Click2call/Directory application server 203 translates that action as a request to set up a communications session between the user and the selected employee. A cookie (the unique ID) is passed from computer system 100 to Reverse Click2call/Directory application server 203, which can consult registered users database 305 to obtain the telephone number associated with the user's telephone 202. Then, an HTTP request message is transmitted from Reverse Click2call/Directory application server 203 to call control application server 209 (609). The parameters of the HTTP request message include the telephone number associated with the mobile handset 213 of the selected employee (obtained from contacts database 205) and the telephone number associated with the user's telephone 202 (obtained, as described above, from the registered users database 305).

Call control application server 209 receives the HTTP call setup request message and then consults the Reverse Click2call registry 211 to check whether the telephone number associated with the mobile handset 213 (received as a parameter in the request message) is registered to use the Reverse Click2call service (611). It also checks whether Reverse Click2call application client 501 is 'on-line'. If it is registered and 'on-line', call control application server 209 responds to latest HTTP request message from Reverse Click2call application client 501. The response message takes the form of an HTTP response, sent from call control application server 209 to Reverse Click2call application client 501, including the telephone number associated with the user's telephone 202 as one of its parameters (613).

Upon receiving the request from call control application server 209, Reverse Click2call application client 501 provides the employee with a visual and/or aural indication that somebody (in this case, the user) is trying to contact them via the Reverse Click2call service (615). The employee may then choose to accept or refuse the call, preferably by using on-screen menus and key presses on mobile handset 213. If the employee chooses to accept the call (617), Reverse Click2call application client 501 then initiates a telephone call back to the user (619) using the mobile Java MIDlet.platformRequest( ) method. The platformRequest( ) method takes a string URL as its input argument, which in the present embodiment takes the form "tel:123456". This is interpreted by the platformRequest( ) method as an instruction to place a telephone call to the number specified, which in the present embodiment will be the telephone number associated with the user's telephone 202, as received from call control application server 209.

A telephone call is therefore placed from mobile handset 213 to telephone 202 (621) over mobile voice network 219 and PSTN 217. A visual and/or aural indication is given to the user (623) that this reverse telephone call has been placed (e.g. telephone 202 begins to ring) and the user answers the telephone call (625) (e.g. by picking up the handset of telephone 202). A telephone call is thus set up between the user and the employee (627). This telephone call was initiated by the user (in steps 603 to 607) but it was placed by mobile handset 213. From the point of view of the telephone network (and the telecommunications company providing telephony services to the user), a telephone call placed from the mobile handset 213 using the platformRequest( ) method is indistinguishable from one placed from the mobile handset 213 by the employee and hence the account associated with the mobile handset 213 will be billed for the call. An office based user can therefore use the Reverse Click2call service to establish a telephone call between themselves and a mobile employee such that the direction of the telephone call, for billing purposes, is from mobile voice network 219 to PSTN 217.

In an alternative embodiment, during installation a JAD (application descriptor file) and JAR (archive file) are downloaded to mobile handset 213. The JAR file contains the compiled Java byte code. The JAD file contains the application client configuration and installation information such as the vendor name, security settings and Push Registry details. (The Push Registry is an API within the Mobile Information Device Profile (MIDP) 2.0 (a profile implemented by J2ME) that enables MIDlets (API applications written for MIDP) to set themselves up to be launched automatically, without user initiation. It is part of the Generic Connection Framework (GCF) and is encapsulated within a single class: javax.microedition.io.PushRegistry.) In preferred embodiments, setting the parameters MiDlet-Push-1:sms://50000, com.bt.ReverseClck2call, * in the JAD file instructs the application manager of mobile handset 213 to launch the ReverseClick2call application client 501 if an SMS message is received on SMS port 50000. Thus registration of mobile handset 213 also binds the Reverse Click2call application client 501 to a particular SMS port number and this port number is notified to the call control application server 209 and stored in the Reverse Click2call registry 211, mapped to the details of mobile handset 213.

In this embodiment, if, upon consulting the Reverse Click2call registry 211, call control application server 209 finds that mobile handset 213 is registered to use the Reverse Click2call service, call control application server 209 sends an HTTP request message to SMS gateway via internet 207. Included in the parameters of the request message are the account details for the SMS gateway (e.g. username and password, which the owner of call control application server 209 will have obtained in advance), the telephone number associated with mobile handset 213, the SMS port number of mobile handset 213 registered for use with the Reverse Click2call service, the telephone number associated with the user's telephone 202 and optionally, a security token (e.g. a digital certificate) that will be used to validate the origin of the SMS message when received by the mobile handset 213. (It will be remembered that the registered port number is stored in Reverse Click2call registry 211 mapped to the details of mobile handset 213.) The SMS gateway 223 receives the request message, generates an SMS message (containing the registered SMS port number of mobile handset 213, the telephone number associated with the user's telephone 202 and the optional security token) and sends it to mobile handset 213 via the mobile voice network 219.

Receipt of the SMS message by mobile handset 213 on the registered SMS port automatically launches the Reverse Click2call application client 501 as described above. Once the application has been launched (which, optionally, may involve an on-screen dialogue with the employee to confirm that launch of the Reverse Click2call application client 501 is acceptable), the contents of the SMS message are passed to the Reverse Click2call application client 501, which can read and process the SMS data. If a security token was included in the SMS message, this is initially checked to ensure that the call setup request originated at a valid server. Reverse Click2call application client 501 then provides the employee with a visual and/or aural indication that somebody (in this case, the user) is trying to contact them via the Reverse Click2call service. The employee may then choose to accept or refuse the call and if they choose to accept it, the Reverse Click2call application client 501 then initiates a telephone call back to the user using the mobile Java method MIDlet.platformRequest("te:123456") as described above.

In either of the above described embodiments, if the employee does not accept the telephone call setup request within a predetermined time limit or actively refuses/rejects/ignores it (using key presses, for example), then the Reverse Click2call application client 501 sends a message back to call control application server 209 (via the established link over GPRS network 215) to indicate that the call setup request cannot be completed. In preferred embodiments, call control application server 209 then sends a message to network call control server 221 instructing it to set up a call between the user's telephone 202 and the voicemail account associated with the employee's mobile handset 213, using its third party call control functionality as described above. During this call setup, the user can optionally be informed that the employee is unavailable and that they are being connected to voicemail rather than directly to the employee. For billing purposes, the direction of this telephone call is from the PSTN 217 to the mobile voice network 219.

Similarly, if the user selects an employee who has not registered their mobile handset 213 with the Reverse Click2call service, this will become apparent when call control application sever 209 checks the Reverse Click2call registry 211. In this case, call control application server 209 sends a message to network call control server 221 instructing it to set up a call between the user's telephone 202 and the employee's mobile handset 213, using its third party call control functionality as described above. During this call setup, the user can optionally be informed that the employee is not registered with the Reverse Click2call service and that they are being connected to the employee directly rather than via a Reverse Click2call call. For billing purposes, the direction of this telephone call is from the PSTN 217 to the mobile voice network 219.

It will be apparent from the foregoing description that many modifications or variations may be made to the above described embodiments without departing from the invention. Such modifications and variations include:

Although in the above described embodiments, registered users database 305 was described as being part of Reverse Click2call/Directory application server 203, in alternative embodiments, it could be part of the call control application server 209. In such embodiments, the unique ID of computer system 100 would be sent as a parameter in the HTTP request message as transmitted from Reverse Click2call/Directory application server 203 to call control application server 209. The telephone number associated with the user's telephone 202 can then be looked up by consulting the registered users database.

Although the above embodiments were described in relation to a business/corporate environment, the invention is equally applicable to other environments (e.g. a home/private/consumer environment.) In such embodiments, network 201 might be replaced by a modem (e.g. an ADSL modem) or a wireless access point. Also, contacts database 205 may be internal to computer system 100 and the Reverse Click2call/Directory application server 203 may be accessible by computer system 100 via internet 207 (which may require the user to log in to the Reverse Click2call/Directory application server 203 using a username and password rather than relying on a persistent cookie, as in some of the above embodiments). The computer system 100 may be loaded with a telephony software package, such as BT Communicator available from British Telecommunications plc. In these embodiments, the Reverse Click2call service registration procedure might also be slightly different since the user will be entering their own home/private telephone number and may need to provide additional authentication information, such as a telephone network account number.

In the above described embodiments, the computer system 100 was used to request call setup. In alternative embodiments, the computer system could be replaced by a telephone (fixed or mobile) enabled with appropriate client software, which would allow a user of the telephone to identify the contact they wished to call using the telephone and which would then send the call setup request to the call control application server 209. The user could identify the contact they wished to call using a contacts database internal to the telephone (e.g. a contacts list/address book) or by using the telephone to access a contacts database external to the telephone (e.g. using a mobile telephone to access an HTML or WAP page via a GPRS network).

It is also possible to combine this invention with the invention described in the Applicant's co-pending European patent application, entitled "Establishing Communications Sessions" and filed on 11 Mar. 2005. In such a combination, a user would use a mobile communications terminal to identify a contact that they wished to call and then a communications session would be established between a communications terminal used by the contact and another communications terminal associated with the user. The direction of this communications session for billing purposes would be from the contact's communications terminal to the user's communications terminal.

Although in the above described embodiments a mobile telephone handset was described, in alternative embodiments it could be replaced by other forms of mobile communications terminal, such as a GSM/GPRS enabled personal digital assistant like the Treo™ 650 available from PalmOne™, Inc., USA.

Moreover, although in the above described embodiments the communication sessions that were established were voice telephone calls, in alternative embodiments the communication sessions could comprise multimedia communication sessions such as video calls.

Although in the above embodiments telephone 202 was described as being connected to PSTN 217, in alternative embodiments it might be connected to a private branch exchange (PBX) that has access to a PSTN.

The invention claimed is:

1. A method of establishing a communications session in a communications system between a user and a contact, said communications system comprising a user terminal, a mobile terminal associated with the contact, and session initiation means, said method comprising:
   identifying said contact using said user terminal;
   looking up a telephone number associated with said user terminal as user data;
   responsive to identifying said contact, transmitting contact data identifying said contact and the user data associated with said user terminal from said user terminal to said session initiation means; and
   in dependence on and responsive to reception of said contact data, transmitting a request from said session initiation means to said mobile terminal, said request comprising said user data and requesting that said mobile terminal establishes said communications session with said user terminal in dependence on said user data,
   further comprising the antecedent step of associating a user computer of the user terminal with a user telephone of the user terminal by storing, in a user registration database, a mapping between computer identification data identifying said user computer and telephone identification data identifying said user telephone,
   wherein said user registration database is accessible by said session initiation means and said user data comprises said computer identification data.

2. The method according to claim 1, wherein said user terminal comprises a user computer and a user telephone associated with said user computer.

3. The method according to claim 1, wherein said user data comprises said telephone identification data.

4. The method according to claim 1, wherein said user terminal comprises a user telephone, said communication session comprises a telephone call and the telephone number associated with the user terminal as said user data comprises a telephone number associated with said user telephone.

5. The method according to claim 1, wherein said contact data is stored in a contacts database accessible by the user terminal.

6. The method according to claim 1, further comprises storing said contact data in a contact registration database accessible by said session initiation means.

7. The method according to claim 1, wherein said request further comprises a security token to be verified by said mobile terminal before responding to said request.

8. A communication session initiation apparatus for establishing a communications session in a communications system between a user and a contact, said communications system comprising a user terminal and a mobile terminal associated with the contact, said apparatus comprising:
 look up means for looking up telephone number associated with said user terminal as user data;
 data receiving means arranged in operation to receive from said user terminal, contact data identifying said contact and the user data associated with said user terminal; and
 request transmission means arranged in operation to transmit a request to said mobile terminal in dependence on and responsive to reception of said contact data and the user data from the user terminal, said request comprising said user data and requesting that said mobile terminal establishes said communications session with said user terminal in dependence on said user data,
 wherein a user computer of the user terminal is associated with a user telephone of the user terminal by storing, in a user registration database, a mapping between computer identification data identifying said user computer and telephone identification data identifying said user telephone.

9. The communication session initiation apparatus according to claim 8, wherein said user terminal comprises a user computer and a user telephone associated with said user computer.

10. The communication session initiation apparatus according to claim 8, wherein said user data comprises said telephone identification data.

11. A call control application server comprising:
 a computer processor configured to:
 receive a call setup request message from a user terminal, the call setup request message including a telephone number associated with the user terminal and a telephone number associated with a mobile terminal;
 process the call setup request message received from the user terminal; and as a result of processing the call setup request message received from the user terminal, transmit a request including the telephone number associated with the user terminal to the mobile terminal so that the mobile terminal is instructed to initiate and establish a telephone call back to the user terminal,
 associate a user computer of the user terminal with a user telephone of the user terminal by storing, in a user registration database, a mapping between computer identification data identifying said user computer and telephone identification data identifying said user telephone,
 wherein said user registration database is accessible by a session initiation means and said user data comprises said computer identification data.

* * * * *

UNITED STATES PATENT AND TRADEMARK OFFICE
CERTIFICATE OF CORRECTION

PATENT NO. : 8,472,951 B2  Page 1 of 1
APPLICATION NO. : 11/886222
DATED : June 25, 2013
INVENTOR(S) : Ringland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1394 days.

Signed and Sealed this
Eighth Day of September, 2015

Michelle K. Lee
*Director of the United States Patent and Trademark Office*